Patented Feb. 3, 1953

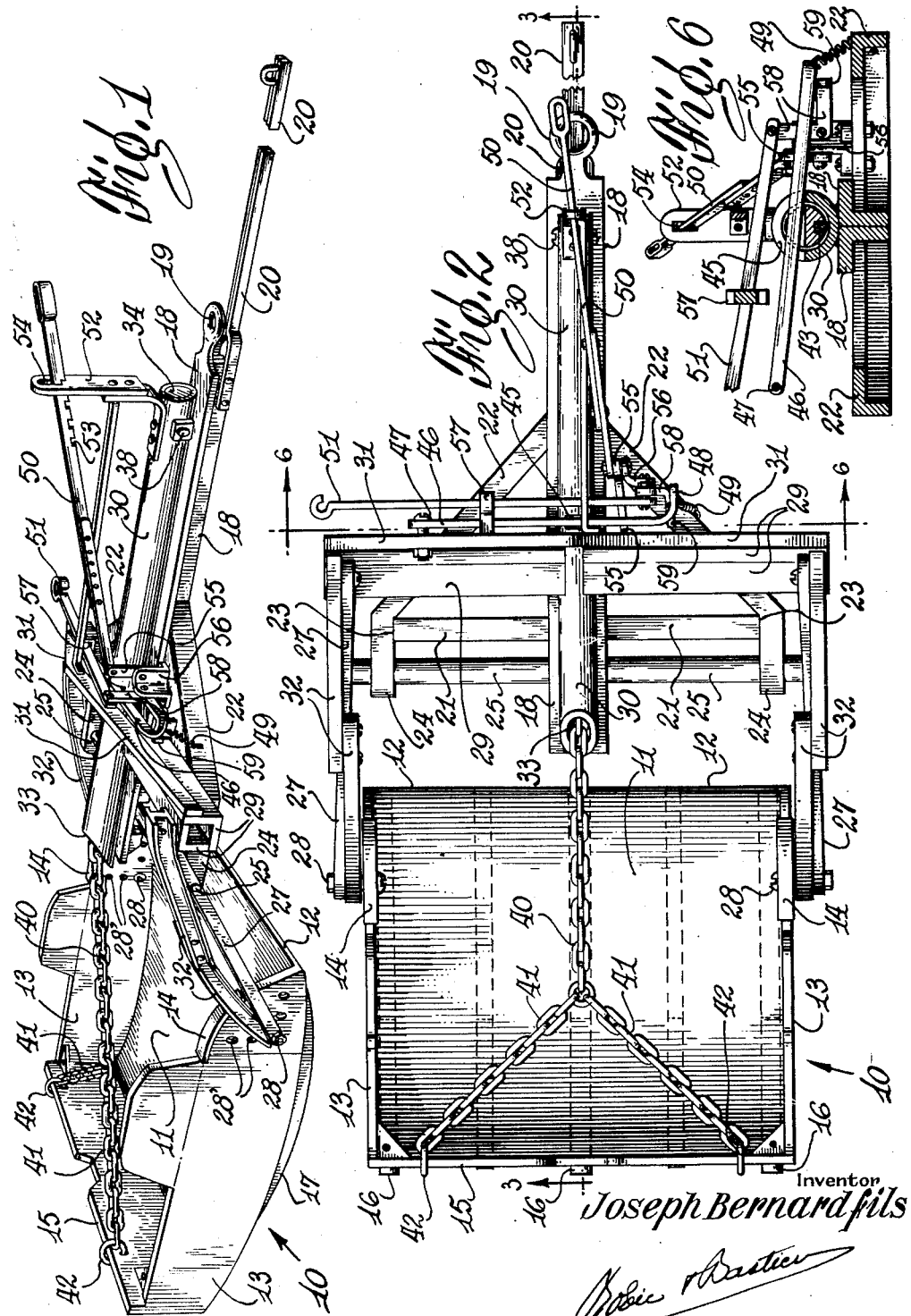

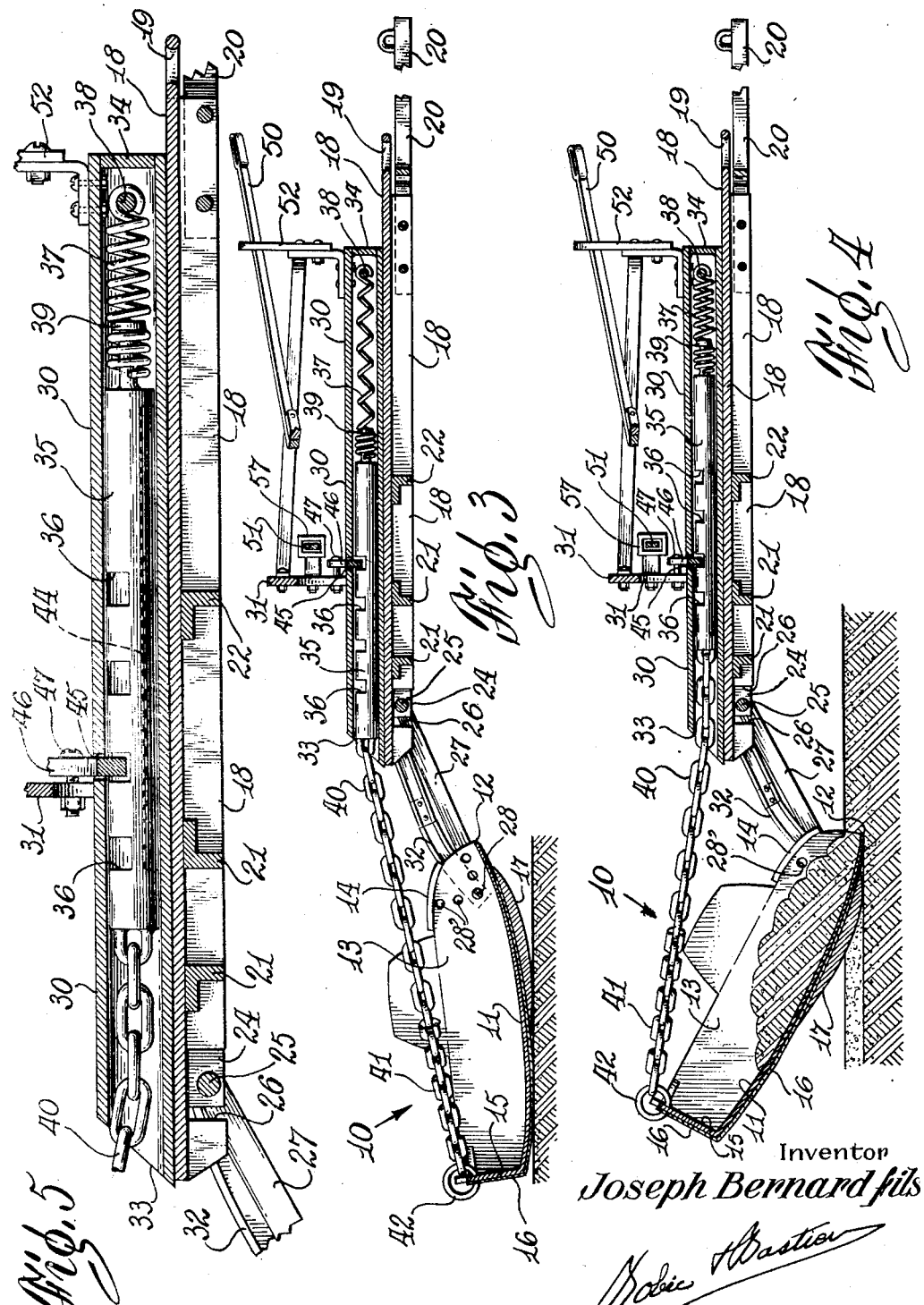

2,627,127

UNITED STATES PATENT OFFICE 2,627,127

LATCH MECHANISM FOR ADJUSTING DRAG SCRAPER OPERATION

Joseph Bernard, Fils, Ste-Germaine, Quebec, Canada

Application August 15, 1951, Serial No. 241,933
In Canada September 12, 1950

2 Claims. (Cl. 37—138)

The present invention relates to a ground working instrument and more particularly to a drag scraper of the type adapted to scrap and collect earth and other materials and to move the same from one place to another.

An object of the present invention is the provision of an improved drag scraper adapted to be operated by a tractor, a horse team or other power means and having a draft arrangement embodying novel means whereby the position of the drag or scoop can be changed by the manipulation of the tractor.

Another important object of the present invention is the provision of a drag scraper of the type above described, which is so arranged that it will automatically tilt and pass over an obstacle whenever it abuts the same.

Another important object, according to the present invention, is the provision of drag scraper of the type above mentioned in which the draft arrangement is attached to the scoop in such a manner as to leave ample clearance between said draft arrangement and the ground level in order that boulders may be easily collected by the scraper.

Still another very important object, according to the present invention, is the provision of a drag scraper of the character above mentioned in which the scoop is upwardly bent at the leading edge and is provided with runners of such a shape as to cause its leading edge to disengage the earth being scraped automatically when traction is stopped whereby the scraper assumes a position ready for conveying purposes.

The foregoing and other important objects according to the present invention will become more apparent during the following disclosure and by referring to the drawings in which:

Figure 1 is a perspective view of the drag scraper according to the invention;

Figure 2 is a plan view of the same;

Figure 3 is a longitudinal section along line 3—3 of Figure 2;

Figure 4 is a longitudinal section similar to that of Figure 3 showing the scoop in another position;

Figure 5 is an enlarged fractional, longitudinal section along the drag beam and the scoop position adjusting means; and Figure 6 is a fractional enlarged cross-section along line 6—6 of Figure 2.

Referring now more particularly to the drawings in which like reference characters indicate like elements throughout, the scoop 10, according to the invention, is preferably provided with a curved bottom 11 so that the leading edge 12 is upwardly projecting. The upright side walls 13 of the scoop are rounded at the portion 14 adjacent the leading edge 12 so as to provide a sliding surface when the scoop is drawn in unloading or tilted position.

The scoop 10 is further provided with a rear upwardly extending wall 15 and may be reinforced by suitable straps 16 extending longitudinally underneath the bottom 11 and exteriorly of the rear wall 15.

Suitable runners 17 are disposed underneath some of the straps 16 and are arcuately shaped so as to provide a pivot point at the forward portion of the scoop about which, whenever traction is ceased, the scoop rocks from a scraping position as shown in Figure 4, to a conveying position as shown in Figure 3.

The draft arrangement comprises a main drag beam 18 preferably having a T-shape and formed of two angle beams disposed side by side and welded together as shown in Figure 6.

The main drag beam 18 is provided at its front end with an integral eye 19 for attachment to a tractor; but, whenever the scraper, according to the invention, is to be pulled by a horse team, a suitable extension 20 is removably attached to the main beam 18 at the forward end thereof as shown in Figure 1 and will normally extend between the two horses.

Cross members 21 extend at right angles to the main beam 18 on both sides and near the rear end thereof and are secured thereto below its top flange. They are provided to support and solidify two diverging beams 22 secured at their forward end to the main beam 18 in a manner similar to the cross members 21 and welded to the outer ends of the cross members 21 at 23 as shown in Figure 2 at which point they are bent to form extensions 24 lying in planes parallel to the main beam 18. The extensions 24 are apertured to receive a shaft 25 extending at right angles to the beam 18 and passing through a suitable notch 26 made in the vertical flange of said beam 18.

At the outer ends of the shaft 25 are pivoted intermediate their ends two link members 27 pivotally connected at their rear end to both side walls 13 of the scoop 10 at the forward portion thereof by means of bolts and nuts 28 engaging one of a plurality of holes 28'. The forward ends of the link members 27 are adapted to describe an arcuate movement and abut a stop member 29 shown in Figures 1 and 2 extending at right angles to the main beam 18 on both sides thereof and welded thereto above its horizontal flange.

The stop member 29 has preferably a square cross section and is made into two sections abutting at their inner end, a tube 30 extending longitudinally of the main beam 18 secured thereto by welding or otherwise on top of its horizontal flange as seen in Figures 2 and 6.

Thus, because the stop member 29 does not extend right across the main beam 18, it is further reinforced by a V-shape member 31, the latter passing over the tube 30.

Although all the figures of the drawings show the link members 27 connecting the scoop 10 to the draft arrangement, according to the invention, abutting the stop member 29 in position of traction, it must be understood that the scoop 10 and the main beam 18, together with its associated elements, are capable of relative movement towards each other, the links 27 pivoting respectively at their pivot bolts 28 on the scoop and at the shaft 25. In the forward limit position, abutting the stop member 29, the links 27 will extend substantially downwardly from the main beam 18 as shown in Figures 3 and 4 in such a manner as to provide substantial clearance between the main beam 18 and the ground level.

The links 27 are preferably reinforced by means of an additional pair of connecting links 32 which have a substantially arcuate shape, both ends of which being connected to both ends of the links 27 in order to form a rigid unit with the same.

The tube 30, previously referred to, is open at its rear end 33 and closed at its forward end 34. A rod 35, provided along its top portion with a plurality of transverse notches 36, is freely slidable within the tube 30 but is urged forwardly thereof by means of a coiled spring 37 connected at its forward end to a cross pin 38 extending through the tube 30 and its rear end enclosing a stud 39 integrally dependent from the forward end of the slidable rod 35.

The rear end of the rod 35 is welded to a link of a chain 40 protruding through the open end 33 of the tube 30 and branching out at a point disposed above the scoop 10 to provide two branches 41 connected at their free end to two spaced points 42 along the top edge of the rear wall 15 of the scoop 10.

In order to prevent the slidable rod 35 to rotate within the tube 30, a key 43 as shown in Figure 6 is positioned at the bottom of said tube and engages a key way 44 made in the corresponding portion of the rod 35 and extending along a substantial portion thereof. Thus the notches 36 are always maintained on top of the rod 35 ready to register with an aperture 45 made in the top portion of the tube 30 at a suitable distance from the rear end 33 thereof.

A latch mechanism is provided for adjustably locking the position of the slidable rod 35 by having a latch bar 46 engaging the aperture 45 and a registering notch 36 of the rod 35.

The latch bar 46 is pivoted at 47 to the V-shaped member 31, and extends across the main beam 18. Its free end is bent forwardly to define a right angle portion 48 which is connected to the beam 22 by means of a spring 49 which normally urges said latch bar 46 in notch engaging position.

Depending on whether the drag scraper, according to the invention, is attached to a tractor or to a horse team, the operator being seated on the tractor or walking along side the scoop respectively, the latch manipulating bar 50 extending forwardly along the beam 18, of the transverse manipulating bar 51 will be operated to disengage the latch bar 46.

The forward end of the bar 50 passes through a slot 54 of the guide bracket 52 secured to the forward end of the tube 30 in upstanding position, said bar 50 being provided with a plurality of notches 53 which may selectively engage the slot 54 of the bracket 52. The rear end of the rod or the bar 50 is pivotally connected to a bell crank lever 55 at one end thereof, the other end of the same adapted to contact and lift the latch bar 46 at a point disposed between the tube 30 and the spring 49. The bell crank 55 is pivotally held on a bracket 56 fastened to one of the members 22.

The cross manipulating bar 51 passes through a guide bracket 57 secured to the V-shaped cross member 31 near the pivot 47 of the latch bar 46. The lever 51 further extends across the draft arrangement above the tube 30 and its outer end is pivotally connected to a bell crank lever 58 itself pivotally held on the bracket 56 and provided at its outer end with a right angle extension 59 adapted to engage and lift the latch bar 46.

The drag scraper, according to the present invention, operates as follows.

Starting from a conveying position as shown in Fig. 3, whenever it is desired to place the scoop 10 in an inclined scraping position as shown in Figure 4, the tractor or power means are backed up and either one of the manipulating handles 50 or 51 operated to disengage the latch bar 46 from the forward notch 36 of the slidable rod 35; thus, during the backing up movement the draft arrangement is displaced towards the scoop 10 and at the same time the chain 40 and the slidable rod 35 are urged towards the front end 34 of the tube 30 by means of the spring 37. The operated handle 50 or 51 is then released so that the latch bar 46 may engage the desired intermediate notch 36 such that when traction is resumed the chain 40 will lift the back of the scoop 10 in such a manner as to provide the desired angle of attack for the latter, as shown in Figure 4.

When the scoop 10 is loaded, either one of the levers 50 and 51 is actuated to release the latch bar, whereby due to the special construction of the scoop 10, as previously described, the latter will pivot or rock rearwardly about its runners 17 to assume the conveying position.

Whenever it is desired to unload the scoop 10, the tractor is stopped and backed up while the latch bar 46 is kept in release position whereby the slidable rod 35 is further urged forwardly in the tube 30 to its limit position whereupon the latch bar 46 is released to engage the rearmost notch 36 of the slidable rod 35. Thus upon resuming traction, the chain 40 will be shortened in such a manner as to lift the rear portion of the scoop 10 sufficiently to cause rocking and unloading of the latter.

It is to be noted that because the chain 40 constitutes a flexible connection between the rear portion of the scoop 10 and the draft arrangement, said scoop is free to tilt over at any time. This is especially important when working in a rocky terrain because whenever the scoop strikes a boulder it will automatically tilt and pass over the same and no injury will be done to the apparatus according to the present invention.

For causing the scoop 10, while in unloading position, to assume a conveying position, it is only necessary to release the latch bar 46 by means of either one of the levers 50 or 51 and then to back up the tractor a sufficient distance so that the rear end of the main beam 18 will engage the rear portion of the scoop 10 and push the same in position.

It will be noted that the more delicate parts of the apparatus, according to the present invention, such as the slidable rod 35 and the spring 37 are well protected within the tube 30 from dirt and rocks.

Although the draft arrangement, according to the present invention, has been described as comprising a main beam 18 with an auxiliary tube 30, it must be understood that the same could be combined to form for instance a hollow beam of rectangular cross-section within which would be slidable a corresponding notched member of rectangular cross-section. This design would eliminate the necessity of the key and key way 43 and 44 provided in the described embodiment to prevent rotation of the slidable rod 35.

Thus while a preferred embodiment according to the present invention has been illustrated and described it is understood that various modifications may be resorted to without departing from the spirit and scope of the appended claims.

The embodiments of the invention in which an exclusive property or privilege is claimed are defined as follows:

1. A drag scraper comprising a scoop, an elongated beam having means at its forward end for connection with a tractor or the like, a cross member rigidly secured to said beam near the rear end thereof, link members pivoted intermediate their ends on the ends of said cross member, and pivotally connected at their rear end to the forward side portions of said scoop, stops mounted on said beam to limit the forward pivoting movement of said link members by abutting the forward end thereof, a flexible link member attached to the rear portion of said scoop, spring means on said beam connected to said flexible link member to urge the same forwardly, and latch means to lock said flexible link member in a number of adjusted positions relatively to said beam, said elongated beam comprising a hollow portion extending longitudinally thereof, said spring means comprising a spring secured to the forward end of said hollow portion and extending within the same, a notched elongated member slidable within said hollow portion and attached at one end to the other end of said spring, said flexible link member secured to the other end of said notched member, said hollow portion having at least one aperture, the notches of said notched member adapted to register with said aperture, and said latch means comprising a latch bar adapted to removably engage said aperture and either one of said notches.

2. A drag scraper as claimed in claim 1, wherein a lever is mounted on said beam to actuate said latch bar from a locking position to an unlocking position.

JOSEPH BERNARD, Fils.

REFERENCES CITED

The following references are of record in the file of this patent:

UNITED STATES PATENTS

| Number | Name | Date |
|---|---|---|
| 1,458,512 | Beach et al. | June 12, 1923 |
| 1,843,266 | Bird | Feb. 2, 1932 |
| 2,152,888 | Hungate et al. | Apr. 4, 1939 |